US012742217B2

(12) United States Patent
Burkhardt et al.

(10) Patent No.: US 12,742,217 B2
(45) Date of Patent: Sep. 22, 2026

(54) PROCESS FOR PRODUCING THIN JUICE FOR THE PRODUCTION OF SUGAR, PROCESS FOR PRODUCING SUGAR AND SUGAR PRODUCTION PLANT

(71) Applicant: PFEIFER & LANGEN IP GMBH, Cologne (DE)

(72) Inventors: Mark-Oliver Burkhardt, Pfungstadt (DE); Wolfgang Klosterhalfen, Kerpen (DE)

(73) Assignee: PFEIFER & LANGEN IP GMBH, Cologne (DE)

( * ) Notice: Subject to any disclaimer, the term of this patent is extended or adjusted under 35 U.S.C. 154(b) by 407 days.

(21) Appl. No.: 18/287,513

(22) PCT Filed: Apr. 21, 2022

(86) PCT No.: PCT/EP2022/060613

§ 371 (c)(1),
(2) Date: Oct. 19, 2023

(87) PCT Pub. No.: WO2022/223727

PCT Pub. Date: Oct. 27, 2022

(65) Prior Publication Data

US 2024/0209465 A1 Jun. 27, 2024

(30) Foreign Application Priority Data

Apr. 23, 2021 (EP) .................................... 21170220

(51) Int. Cl.
*C13B 10/14* (2011.01)
*G01N 21/3577* (2014.01)
*G01N 21/359* (2014.01)

(52) U.S. Cl.
CPC ......... *C13B 10/14* (2013.01); *G01N 21/3577* (2013.01); *G01N 21/359* (2013.01)

(58) Field of Classification Search
CPC ......... C13B 10/14; C13B 10/02; C13B 10/12; C13B 20/16; C13B 10/00; C13B 10/003;
(Continued)

(56) References Cited

U.S. PATENT DOCUMENTS 2,007,971 A * 7/1935 Jackson ................. C13K 11/00
127/58
2,064,135 A * 12/1936 White ..................... C13B 20/06
261/87

(Continued)

FOREIGN PATENT DOCUMENTS

CA 350090 A 5/1935
CN 102230885 A 11/2011

(Continued)

OTHER PUBLICATIONS

Escapenet Machine translation of CN204705925U, Oct. 14, 2015. (Year: 2015).*

(Continued)

*Primary Examiner* — Joseph W Drodge
(74) *Attorney, Agent, or Firm* — The Dobrusin Law Firm, P.C.

(57) ABSTRACT

The present invention relates to a process for producing thin juice (17, 27) for the production of sugar, wherein lime milk—in a first liming step (3)—is first added to a raw juice (14) to obtain a mixture of raw juice and lime milk (15), and then carbon dioxide—in a first carbonation step (4)—is added to the mixture of raw juice and lime milk (15) to obtain a mixture of raw juice and precipitated non-sugar substances (16), and the mixture of raw juice and precipitated non-sugar substances (16) is then—in a first filtration step (5)—filtered to obtain a first thin juice (17), (Continued)

lime milk—in a second liming step (3')—is optionally added to the first thin juice (17) to obtain a mixture of first thin juice and lime milk (25), and carbon dioxide—in a second carbonation step (4')—add carbon dioxide to the first thin juice (17) or the mixture of first thin juice and lime milk (25) to obtain a mixture of first thin juice and precipitated non-sugar substances (26), and—in a second filtration step (5')—filter the mixture of first thin juice and precipitated non-sugar substances (26) to obtain a second thin juice (27), wherein at least one first sensor device (21) is used to detect first measurement data relating to the mixture of raw juice and lime milk (15) and/or the mixture of first thin juice and lime milk (25) during or after the first or second liming step (3, 3'), and/or at least one second sensor device (22) is used to detect second measurement data relating to the mixture of raw juice and precipitated non-sugar substances (16) and/or the mixture of first thin juice and precipitated non-sugar substances (26) during or after the first or second carbonation step (4, 4'), and/or at least one third sensor device (23) is used to detect third measurement data relating to the first and/or second thin juice (17).

19 Claims, 2 Drawing Sheets

(58) Field of Classification Search

CPC ......... C13B 20/00; C13B 20/02; C13B 20/04; C13B 20/06; C13B 20/165; C13B 30/00; C13B 30/02; C13B 30/04; G01N 21/3577; G01N 21/359; G01N 21/25; G01N 21/27; G01N 21/272; G01N 33/14; G01N 33/143; A23L 33/105; A23L 2/02; A23L 2/08

See application file for complete search history.

(56) References Cited

U.S. PATENT DOCUMENTS

| | | | | |
|---|---|---|---|---|
| 2,520,957 | A * | 9/1950 | Peterson | C13B 20/06 127/11 |
| 3,113,043 | A * | 12/1963 | Alston | C13B 20/06 127/50 |
| 6,630,672 | B1 | 10/2003 | Brotherton et al. | |
| 8,211,675 | B2 | 7/2012 | Visser et al. | |
| 8,669,064 | B2 | 3/2014 | Steiner et al. | |
| 2003/0196653 | A1* | 10/2003 | Sanders | C13B 20/02 127/50 |
| 2004/0231663 | A1* | 11/2004 | Carter | C13B 30/02 127/30 |
| 2005/0214419 | A1 | 9/2005 | Aberle et al. | |
| 2010/0216114 | A1 | 8/2010 | Friedhoff et al. | |
| 2010/0285186 | A1 | 11/2010 | Kannar et al. | |
| 2018/0232689 | A1* | 8/2018 | Minvielle | G06T 7/194 |
| 2022/0082542 | A1* | 3/2022 | Lachwani | G01N 33/14 |

FOREIGN PATENT DOCUMENTS

| | | | | |
|---|---|---|---|---|
| CN | 204705925 | U * | 10/2015 | |
| CN | 112048496 | A * | 12/2020 | C13B 20/002 |
| DE | 102017113132 | A1 | 12/2018 | |
| DE | 102018127846 | A1 | 5/2020 | |
| EP | 1682683 | B1 | 1/2008 | |
| FR | 2807163 | B1 | 6/2002 | |
| GB | 2377019 | A | 12/2002 | |
| WO | 2004/076696 | A1 | 9/2004 | |
| WO | 2013/049905 | A1 | 4/2013 | |
| WO | 2019/185149 | A1 | 10/2019 | |
| WO | 2020/027731 | A1 | 2/2020 | |
| WO | 2022/214589 | A1 | 10/2022 | |
| WO | 2022/214607 | A1 | 10/2022 | |
| WO | 2022/223728 | A1 | 10/2022 | |
| WO | 2022/223729 | A1 | 10/2022 | |

OTHER PUBLICATIONS

Escapenet Machine translation of DE101017113132A1, Dec. 20, 2018. (Year: 2018).*

Escapenet Machine translation of CN112048496A, Dec. 18, 2020. (Year: 2020).*

International Search Report, PCT Application No. PCT/EP2022/060613 dated Aug. 9, 2022.

Fevotte, G. et al., "Application of NIR Spectroscopy to monitoring and analyzing the solid state during industrial crystallization processes", International Journal of Pharmaceutics, vol. 273, No. 1-2, Apr. 1, 2014.

Leiging, Pan et al., "Measurement of moisture, soluble solids, sucrose content and mechanical properties in sugar beet using portable visible and near-infrared spectroscopy", Postharvest Biology and Technology, vol. 102, Feb. 5, 2015.

Copending, U.S. Appl. No. 18/287,581, filed Oct. 19, 2023; published as WO2022/223728.

Copending, U.S. Appl. No. 18/287,564, filed Oct. 19, 2023; published as WO2022/223729.

* cited by examiner

PROCESS FOR PRODUCING THIN JUICE FOR THE PRODUCTION OF SUGAR, PROCESS FOR PRODUCING SUGAR AND SUGAR PRODUCTION PLANT

PRIOR ART

The present invention relates to a process for producing thin juice for the production of sugar, wherein—in a first liming step—lime milk is first added to a raw juice to obtain a mixture of raw juice and lime milk, and then—in a first carbonation step—carbon dioxide is added to the mixture of raw juice and lime milk to obtain a mixture of raw juice and precipitated non-sugar substances, and then—in a first filtration step—the mixture of raw juice and precipitated non-sugar substances is then filtered to obtain a first thin juice. The invention further relates to a process for producing sugar. Another subject matter of the invention is a sugar production plant with a device for juice purification, which is set up—in a first liming step—to first add lime milk to a raw juice to obtain a mixture of raw juice and lime milk, and then—in a first carbonation step—adding carbon dioxide to the mixture of raw juice and lime milk to obtain a mixture of raw juice and precipitated non-sugar substances, and then—in a first filtration step—filtering the mixture of raw juice and precipitated non-sugar substances to obtain a first thin juice.

As part of industrial sugar production, a raw juice is extracted from plants with a high sugar content, such as sugar beets or sugar cane. This can be done through a diffusion process or, in the case of sugar cane, through press extraction. However, the raw juice resulting from the extraction still contains a plurality of non-sugar substances. These non-sugar substances are partially removed in a purification process called juice purification. Lime milk is added to the raw juice and then lime and non-sugar substances are precipitated by adding carbon dioxide. These are filtered out to obtain a thin juice as a filtrate. The thin juice is thickened in subsequent process steps and the sugar it contains crystallizes and is separated.

Sugar production, particularly the juice purification process, requires careful adjustment and, if necessary, tracking of process parameters. It is therefore necessary to determine ingredients in the raw juice and/or in the thin juice. For this purpose, according to the state of the art, it is common practice to take samples and examine these in a laboratory. The sampling and subsequent examination in the laboratory is associated with a certain processing time, which must be waited before the results of the analysis are available and reactions, such as tracking of process parameters, are possible.

DE 10 2017 113 132 A1 describes a process for improving the yield in sugar production, in which chips and raw sugar juice are produced in an extraction system using ultrasound, wherein the raw sugar juice is passed over an ultrasound unit before a first carbonation stage. By breaking up dextrans using ultrasound, which creates cavitation in the raw sugar juice, the long-chain molecules are broken up. A regulation and control unit connected to the ultrasound unit makes it possible to evaluate measured data from a sensor system and to control and regulate the ultrasound unit using corresponding signals as suitable reference variables.

CA 350 090 A describes the control of the $CO_2$ gas addition in sugar production depending on a measurement of the electrical resistance of the treated juice.

DISCLOSURE OF THE INVENTION

Against this background, it is the problem of the present invention to enable tracking of process parameters with lower latency.

To solve the problem, a process for producing thin juice for producing sugar is proposed, wherein lime milk is first added to a raw juice—in a first liming step—to obtain a mixture of raw juice and lime milk, and carbon dioxide is then added to the mixture of raw juice and lime milk—in a first carbonation step—to obtain a mixture of raw juice and precipitated non-sugar substances, and the mixture of raw juice and precipitated non-sugar substances is then—in a first filtration step—filtered to obtain a first thin juice, optionally—in a second liming step—lime milk is added to the first thin juice to obtain a mixture of first thin juice and lime milk, and optionally—in a second carbonation step—carbon dioxide is added to the first thin juice or the mixture of first thin juice and lime milk to obtain a mixture of first thin juice and precipitated non-sugar substances, and—in a second filtration step—the mixture of first thin juice and precipitated non-sugar substances is filtered to obtain a second thin juice, wherein at least one first sensor device is used to detect first measurement data relating to the mixture of raw juice and lime milk and/or the mixture of first thin juice and lime milk during or after the first or second liming step, and/or at least one second sensor device is used to detect second measurement data relating to the mixture of raw juice and precipitated non-sugar substances and/or the mixture of first thin juice and precipitated non-sugar substances during or after the first or second carbonation step, and/or at least one third sensor device is used to detect third measurement data relating to the first and/or second thin juice.

In the process according to the invention, one or more sensor devices are used to obtain measurement data relating to the respective mixture during or after the first and/or second liming step and/or mixture during or after the first and/or second carbonation step and/or the first and/or the second thin juice. These sensor device(s) enable determination of the ingredients of the raw juice or thick juice without the need for time-consuming sampling and examination in a laboratory. Instead, it is possible with the process according to the invention to determine the ingredients during the ongoing production process without removing raw juice and/or thin juice. The sensor device(s) also enable(s) the analysis and/or control of juice purification and/or other devices or process steps in the sugar production process with low latency.

Preferably, additional soda or caustic soda is added in the first and/or second carbonation step to precipitate non-sugar substances and to adjust the hardness of the thin juice. The first and/or second filtering step can be designed in one or more stages.

According to an advantageous design of the invention, at least one process parameter of the first and/or second liming step and/or the first and/or second carbonation step and/or the first and/or second filtration step is set depending on the first measurement data and/or the second measurement data and/or third measurement data. Setting the process parameters depending on the measurement data detected by one or more of the sensor devices can enable the process parameters of juice purification to be tracked with low latency. The at least one process parameter can be, for example, an added amount of lime milk and/or a target value of the pH value and/or a concentration of the lime milk and/or an added amount of precipitated calcium carbonate (PCC for short) and/or a withdrawal amount of carbonated juice and/or an operating parameter of a filter.

According to an advantageous design of the process according to the invention, the first sensor device has a first optical imaging device and the first measurement data includes first image data, and/or the second sensor device has a second optical imaging device and the second measurement data includes second image data, and/or the third sensor device has a third optical imaging device and the third measurement data comprises third image data.

Using the first, second, and/or third image data, it is possible to determine one or more geometric properties of the particles and/or air inclusions contained in the respective raw juice or thin juice. For example, a flake shape of the particles can be determined as a geometric property. Alternatively or additionally, kinetic properties of the particles and/or air inclusions contained in the respective raw juice or thin juice can be determined using the first, second, and/or third image data, e.g. a rate of descent.

A color of a liquid phase of the respective raw juice or thin juice is preferably determined based on the first, second, and/or third image data. Particularly preferably, an added amount of lime milk is set in the first and/or second liming step depending on the determined flake shape of the particles and/or the determined color of the liquid phase. This can counteract an undesirable overdose of lime milk. Alternatively or additionally, an added amount of dextranase is set depending on the determined flake shape of the particles and/or the determined color of the liquid phase.

According to an advantageous design of the process according to the invention, the first sensor device has a first near-infrared spectroscopy device and the first measurement data includes a first content indication of an ingredient, and/or the second sensor device has a second near-infrared spectroscopy device and the second measurement data includes a second content indication of an ingredient, and/or the third sensor device has a third near-infrared spectroscopy device and the third measurement data includes a third content indication of an ingredient.

The one or more near-infrared spectroscopy device(s)—also referred to as NIRS device(s)—detect measurement data from which conclusions can be drawn about the ingredients of the raw juice or thin juice being examined. The respective NIRS device makes use of a process in which the juice to be examined is irradiated with electromagnetic radiation in the near infrared range, for example in a spectral range from 400 nm to 2,500 nm. Such irradiation can stimulate molecular vibrations in the material being examined. The electromagnetic radiation triggered by the molecular vibrations in the near-infrared range, for example in a spectral range from 400 nm to 2,500 nm, is detected and resolved spectroscopically. The type and/or amount of ingredients in the materials examined can be determined from the detected spectra. The measurement data from the near-infrared spectroscopy device(s) can, for example, indicate the detection of the following ingredients or their content: sucrose, fructose, glucose, lactic acid, oxalic acid, oxalates, nitrates, nitrites, pectins, dextrans, nitrogen. Preferably, the measurement data detected with the respective near-infrared spectroscopy device can result from multiple measurements from different directions. For this purpose, the respective near-infrared spectroscopy device comprises a plurality of detectors which are arranged with different orientations relative to the material being examined. By means of such a measurement from multiple directions, the ingredients can be determined with increased accuracy from the respective measurement data.

Preferably, the first, second, and/or third measurement data include an indication of the content of the pectins and/or dextrans, wherein a status indication of a state of one or more filter devices, for example filter candles, is determined on the basis of the content of the pectins and/or dextrans used in the filtration step. Additional image data from the first, second, and/or third optical imaging device(s) is preferably used to determine the status indication. By means of such a determination, in particular prediction, of the status indication, a warning can be generated which indicates that a filter device needs to be changed or serviced. Consequently, undesirable downtimes of the sugar production plant, which result, for example, from unexpected defects in filter devices, can be avoided.

Preferably, the first, second, and/or third measurement data include(s) an indication of the content of the pectins and/or dextrans, wherein an added amount of dextranase is determined based on the indication of the content of the pectins and/or dextrans. Dextranase is typically added to break down dextran, which can make filtration and crystallization of the sugar difficult.

In an advantageous design of the invention, the first sensor device has a first nitrogen sensor and the first measurement data includes a first nitrogen concentration, and/or the second sensor device has a second nitrogen sensor and the second measurement data includes a second nitrogen concentration, and/or the third sensor device has a third nitrogen sensor and the third measurement data includes a third nitrogen concentration.

The detected nitrogen concentration(s) make it possible to determine quality indication, in particular quality indication that relates to the color of the raw juice or thin juice. The nitrogen concentration(s) can be used to predict the color formation in the process steps following juice purification and/or to set process parameters of the process steps of the sugar production following juice purification.

According to an advantageous design of the invention, the third sensor device has a turbidity and/or color sensor and the third measurement data includes a turbidity and/or color indication. Based on the turbidity and/or color indication, conclusions can be drawn about the quality of the thin juice. Preferably, a process parameter of the first and/or second filtration step is set depending on the turbidity and/or color indication, for example an operating parameter of a filter.

According to an advantageous design of the process, the third sensor device can alternatively or additionally have a Brix sensor, and the third measurement data includes a sugar content. Brix measurement is the determination of the dry matter content. By combining the two measuring processes, the purity of the sugar solution can be determined.

A design has proven advantageous in which the first sensor device is arranged in a first bypass line, into which the mixture of raw juice and lime milk or the mixture of first thin juice and lime milk is introduced during or after the first or second liming step, and a standing mixture is generated to detect the first measurement data, and/or the second sensor device is arranged in a second bypass line, into which the mixture of raw juice and precipitated non-sugar substances or the mixture of first thin juice and precipitated non-sugar substances is introduced during or after the first or second carbonation step, and a standing mixture is generated for detecting the second measurement data, and/or the third sensor device is arranged in a third bypass line, into which the first or second thin juice is introduced and a standing thin juice is generated to detect the third measurement data.

The bypass line can include both an inlet for supplying the juice to be examined and an outlet for returning the examined juice to the production process after measurement. In this respect, the bypass line forms a path parallel to the regular production flow at a certain point in the production process. In the standing raw juice or thin juice, a measurement can be carried out with increased accuracy by an optical imaging device and/or a near-infrared spectroscopy device and/or a nitrogen sensor and/or a turbidity and/or color sensor, which reduces disruptive effects generated by the flow dynamics of the respective juice. In addition—particularly with regard to a nitrogen sensor—the juice to be examined can be processed in the bypass line. For example, the juice to be examined can be diluted and/or reagents can be added.

In this context, it is advantageous if, after carrying out a measurement in the first, second and/or third bypass line, a self-cleaning procedure is carried out to clean the bypass line. As part of this self-cleaning procedure, lime deposits and/or calcium oxalate in particular can be removed. The self-cleaning procedure preferably comprises a separation step in which the bypass line is fluidically separated from the regular process flow, for example by closing an inlet of the bypass line and an outlet of the bypass line. The bypass line can be cleaned using a cleaning medium, in particular an acid. The cleaning medium can be introduced or withdrawn via a cleaning medium inlet and cleaning medium outlet, respectively, that is designed separately from the inlet and the outlet.

According to an advantageous design of the process according to the invention, a particle size of particles is determined based on the first measurement data, in particular first image data, and/or the second measurement data, in particular second image data, and/or third measurement data, in particular third image data. The particle size can be specified, for example, by a length and/or a width and/or a cross-sectional area and/or a diameter and/or an equivalent diameter and/or a circumference. The particle size can be an average particle size or a median of the particle size, that is, in particular a mean or median of a length and/or a width and/or a cross-sectional area and/or a diameter and/or an equivalent diameter and/or a circumference. Preferably, at least one process parameter of the first or second liming step and/or of the first or second carbonation step and/or of the first or second filtration step is set depending on the determined particle size.

According to an advantageous design of the process according to the invention, a rate of descent of particles is determined based on the first measurement data, in particular first image data, and/or the second measurement data, in particular second image data, and/or third measurement data, in particular third image data. Preferably, at least one process parameter of the first or second liming step and/or the carbonation step and/or the filtration step is set depending on the determined rate of descent.

According to an advantageous design of the process according to the invention, a crystal habit of calcium carbonate is determined based on the first measurement data, in particular first image data, and/or the second measurement data, in particular second image data, and/or third measurement data, in particular third image data. Preferably, at least one process parameter of the first or second liming step and/or of the first or second carbonation step and/or of the first or second filtration step is set depending on the determined crystal habit.

To solve the problem mentioned at the outset, a process for producing sugar is also proposed, in which thin juice is produced according to a process described above and sugar is produced from the thin juice in subsequent process steps.

The process for producing sugar can achieve the same advantages that have already been described in connection with the process for producing thin juice.

According to an advantageous design of the process for producing sugar, at least one process parameter of one of the subsequent process steps is set as a function of the first measurement data and/or the second measurement data and/or third measurement data. Setting the process parameters depending on the measurement data detected by one or more of the sensor devices can enable the process parameters of one of the subsequent process steps to be tracked with low latency.

Preferably, the subsequent process step is a thickening step or a crystallization step or a separation step. In the thickening step and/or crystallization step, the process parameters that can be set are, for example, an evaporation temperature when thickening the thin juice and/or a dwell time when thickening the thin juice and/or a number of crystallization steps of the thick juice formed during thickening.

According to an advantageous design of the process for producing sugar, an extraction step is carried out to provide the raw juice in order to obtain the raw juice from sugar beet pulp, wherein at least one process parameter of the extraction step depends on the first measurement data and/or the second measurement data and/or third measurement data is set. The process parameter of the extraction step can be, for example, an extraction time, which indicates the duration for which the sugar beet pulp remains in the extraction device and/or an extraction temperature, which indicates the temperature at which the extraction device is operated.

In an advantageous design of the process for producing sugar, the sugar beet pulp is cut from sugar beets using a cutting machine and a process parameter of the cutting machine is set depending on the first measurement data and/or the second measurement data and/or third measurement data. This allows process parameters of the cutting machine to be tracked with low latency.

In addition to the advantageous designs explained above, the advantageous designs and features described in connection with the process for producing thin juice can also be used alone or in combination in the process for producing sugar.

The invention further relates to a sugar production plant with a device for juice purification, which is set up to in a first liming step—first add lime milk to a raw juice to obtain a mixture of raw juice and lime milk, and then—in a first carbonation step—add carbon dioxide to the mixture of raw juice and lime milk to obtain a mixture of raw juice and precipitated non-sugar substances, and then—in a first filtration step—filter the mixture of raw juice and precipitated non-sugar substances to obtain a first thin juice, optionally—in a second liming step (3')—add lime milk to the first thin juice (17) to obtain a mixture of first thin juice and lime milk (25), and optionally—in a second carbonation step (4')—add carbon dioxide to the first thin juice (17) or the mixture of first thin juice and lime milk (25) to obtain a mixture of first thin juice and precipitated non-sugar substances (26), and—in a second filtration step (5')—filter the mixture of first thin juice and precipitated non-sugar substances (26) to obtain a second thin juice (27), characterized by:

at least one first sensor device for detecting first measurement data relating to the mixture of raw juice and lime milk and/or the mixture of first thin juice and lime milk during or after the first or second liming step, and/or at least one second sensor device for detecting second measurement data relating to the mixture of raw juice and precipitated non-sugar substances and/or the mixture of first thin juice and precipitated non-sugar substances during or after the first or second carbonation step, and/or a third sensor device for detecting third measurement data relating to the first or second thin juice.

In the sugar production plant, the same advantages can be achieved that have already been described in connection with the process for producing sugar.

In the sugar production plant, the advantageous configurations and features described in connection with the process explained above can be used alone or in combination.

Further advantages, features, and details of the invention will be apparent from the drawings as well as from the following description of a preferred exemplary embodiment based on the drawings. The drawings merely illustrate an exemplary embodiment of the invention, which does not limit the inventive concept.

BRIEF DESCRIPTION OF THE FIGURES

FIG. 3 shows a process for producing sugar according to a second exemplary embodiment of the invention.

EMBODIMENTS OF THE INVENTION

Figure 1:
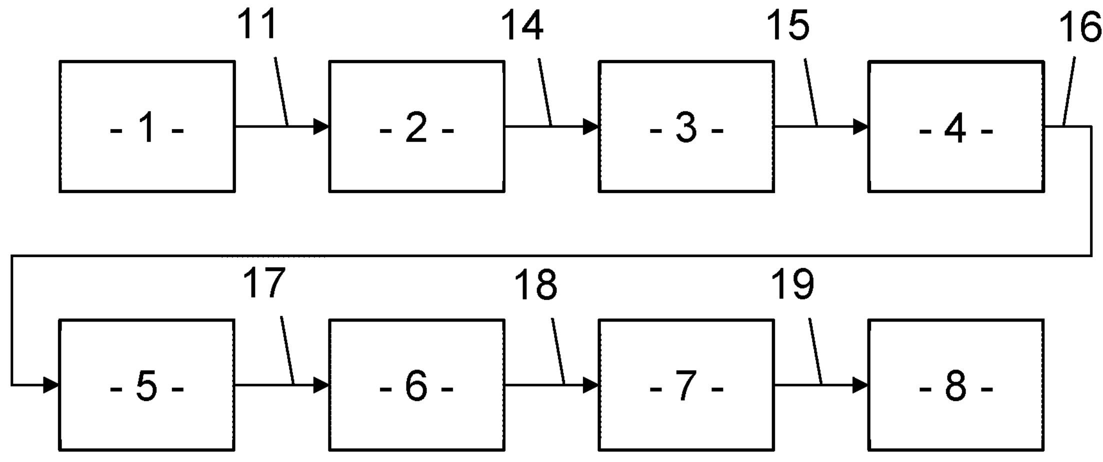
FIG. 1 shows a process for producing sugar according to a first exemplary embodiment of the invention.

In the various figures, the same parts are always provided with the same reference numerals and are therefore usually only named or mentioned once.

The flow chart shown in FIG. 1 shows a first exemplary embodiment of a process according to the invention for producing sugar, which is carried out in a sugar production plant. In the exemplary embodiment, sugar beets are used as the starting material. The sugar beets delivered to the sugar production plant are preferably first cleaned, that is, freed from buildup such as soil, sand, or leaves. In a first process step of cutting 1, the sugar beets are crushed by a cutting machine obtain sugar beet pulp 11.

The sugar beet pulp 11 is leached by water in an extraction device in an extraction process step 2 or juice extraction step following cutting 1. Optionally, the sugar beet pulp 11 can first be preheated, for example in a range from 60° C. to 80° C., to make the cell walls more permeable. The actual extraction 2 takes place in a countercurrent process in which the sugar beet pulp 11 is conveyed or passed through the extraction device in a countercurrent to hot water. The product of extraction 2, in addition to sugar beet pulp residue, is raw juice 14, which contains almost all of the sugar contained in the sugar beets.

According to a modification of the exemplary embodiment, sugar cane can be used as the starting material. The sugar cane is first cut and can then also be fed to an extraction step 2 to extract raw juice 14 using a diffusion process. Alternatively, the raw juice can be obtained by press extraction—i.e. by pressing the sugar cane or sugar cane chips.

Lime in the form of lime milk is added to the raw juice 14 in a liming process step 3. The lime binds non-sugar substances contained in the raw juice 14. Acids are neutralized and the pH value is raised.

In the subsequent process step of carbonation 4, carbon dioxide is introduced into the mixture 15 of raw juice and lime milk. Calcium and other non-sugar substances are bound and precipitate as lime (calcium carbonate). In the subsequent process step of filtration 5, the lime is then separated off and the thin juice 17 remains. The process steps of liming 3, carbonation 4 and filtration 5 are also referred to as juice purification. The steps of liming 3, carbonation 4, and filtration 5 can optionally be carried out in this order multiple times, for example twice in a row, to improve the cleaning result, see FIG. 3.

This is followed by the process step of thickening 6, in which the thin juice 17 is thickened in a usually multi-stage heating process to obtain the thick juice 18.

Sugar is crystallized from the thick juice 18 in a crystallization process step 7 at high temperature and negative pressure. The crystallization 7 preferably comprises multiple successive crystallization steps. A mixture 19 of thick juice and granulated sugar is obtained, which is also known as magma.

Finally, the crystal sugar is separated in a separation process step 8, for example in a centrifuge.

Figure 2:
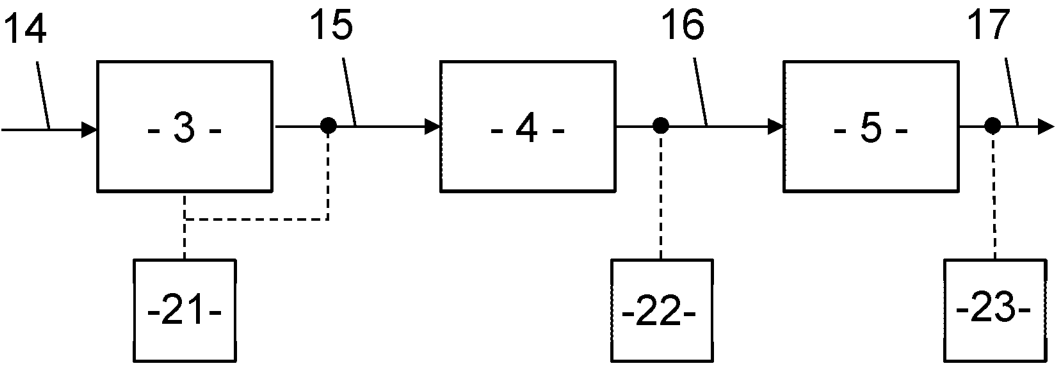
FIG. 2 shows a process for producing thin juice according to a first exemplary embodiment of the invention.

In the process according to FIG. 1, juice purification according to the invention with the process steps liming 3, carbonation 4, and filtration 5 is used, which will be explained below using the illustration in FIG. 2.

During juice purification, lime milk is first added to the raw juice 14 in the liming step 3 to obtain a mixture 15 of raw juice and lime milk. During the liming step 3, first measurement data relating to the mixture of raw juice and lime milk are detected with a first sensor device 21 during the liming step. For example, the liming step 3 can include a sub-step of pre-liming, and the first sensor device 21 can detect first measurement data relating to the raw juice after pre-liming. In such a configuration, the end point of the pre-liming can be determined by evaluating the measurement data detected with the first sensor device 21. The pre-liming sub-step can be followed by a main liming sub-step. A second main liming step can optionally be intended. Alternatively, the first sensor device 21 can be arranged after the liming step 3, so that measurement data relating to the mixture 15 of raw juice and lime milk are detected.

Carbon dioxide is then added to the mixture 15 of raw juice and lime milk in the carbonation step 4. This causes non-sugar substances to precipitate. The resulting mixture 16 of raw juice and precipitated non-sugar substances is detected by a second sensor device 22 to obtain second measurement data relating to the mixture of raw juice and precipitated non-sugar substances after the carbonation step. Alternatively, the second sensor device 22 can be arranged such that measurement data is detected during the carbonation step 4.

The mixture 16 of raw juice and precipitated non-sugar substances is then filtered in the filtration step 5 to obtain the thin juice 17. Third measurement data relating to the thin juice 17 is detected with a third sensor device 23.

In the exemplary embodiment, the first sensor device 21 comprises an optical imaging device which detects first image data. The optical imaging device can be designed, for example, as a camera, in particular as a color camera. The optical imaging device of the first sensor device 21 is used to determine first image data, on the basis of which a particle size of particles/flakes contained in the raw juice is determined. Alternatively or additionally, a rate of descent of the particles is determined. Alternatively or additionally, a flake shape and/or a color of the particles is determined. Alternatively or additionally, the crystal habitus of calcium carbonate contained in the raw juice is determined. A process parameter of the liming step is set depending on the specific values—that is, the particle size and/or the rate of descent and/or the crystal habit. For example, the added amount of lime milk and/or a target value of the pH value and/or a concentration of the lime milk and/or an added amount of precipitated calcium carbonate can be set depending on the specific values. The added amount of lime milk and/or an added amount of dextranase is preferably adjusted depending on the flake shape and/or color of the particles determined.

The second sensor device 22 according to the exemplary embodiment comprises an optical imaging device which detects second image data and a near-infrared spectroscopy device which determines content indication on ingredients of the mixture 16 of raw juice and precipitated non-sugar substances. These are the following ingredients and their content: sucrose, fructose, glucose, lactic acid, oxalic acid, oxalates, nitrates, nitrites, pectins, dextrans, nitrogen. Depending on the determined dextran content, the added amount of dextranase added during juice purification is controlled. Furthermore, the extraction time and/or extraction temperature is set in extraction step 2 depending on the determined glucose content. Depending on the determined glucose content, an evaporation temperature during thickening 6 of the thin juice 17 and/or a dwell time during thickening 6 of the thin juice 17 and/or a number of crystallization steps during crystallization 7 of the thick juice 18 are also set.

In addition, a status indication regarding a condition of the filter devices used for filtering 5, for example filter candles, can be determined based on the content of pectins and/or dextrans determined as well as on the image data from the optical imaging device of the second sensor device 22.

The third sensor device 23 has a near-infrared spectroscopy device that determines content indication on the ingredients of the thin juice 17, as well as a turbidity and/or color sensor and a Brix sensor. The measurement data detected with the third sensor device 23 enables quality control of the juice purification processes 3, 4, 5.

The flow chart shown in FIG. 3 shows a second exemplary embodiment of a process according to the invention for producing sugar, which is carried out in a sugar production plant. The procedure according to the second exemplary embodiment corresponds to the first exemplary embodiment as described in FIG. 1, except that a two-stage juice purification 3, 4, 5, 3', 4', 5' is carried out. In a second liming step 3', lime milk is added to the first thin juice 17 to obtain a mixture of first thin juice and lime milk 25. Carbon dioxide and preferably soda or caustic soda are then added to this mixture of first thin juice and lime milk 25 in a second carbonation step 4' to obtain a mixture of first thin juice and precipitated non-sugar substances 26. This mixture of first thin juice and precipitated non-sugars 26 is then filtered in a second filtration step 5', so that a second thin juice 27 is obtained. The second filtration step 5' is preferably multi-stage, e.g. two-stage.

Figure 4:
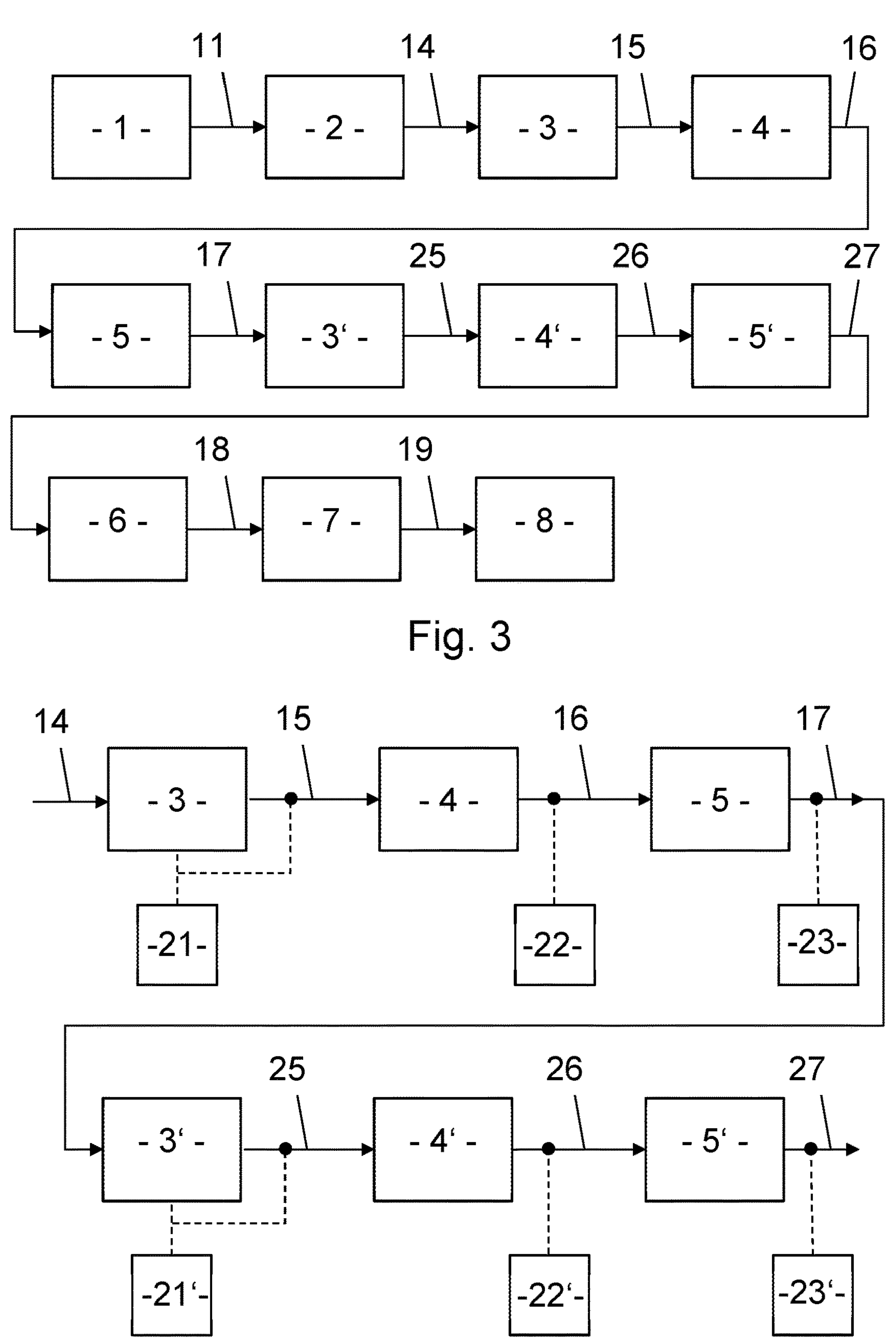
FIG. 4 shows a process for producing thin juice according to a second exemplary embodiment of the invention.

The two-stage juice purification according to FIG. 3 is explained in more detail below using the illustration in FIG. 4.

In contrast to the juice purification according to the first exemplary embodiment, the juice purification of the second exemplary embodiment provides for another first sensor device 21' which, during the second liming step 3' detects other first measurement data relating to the mixture of the first thin juice and lime milk. The other first sensor device 21' comprises an optical imaging device, which detects further first image data. The optical imaging device can be designed, for example, as a camera, in particular as a color camera. The optical imaging device of the first sensor device 21 is used to determine first image data, on the basis of which a particle size of particles contained in the raw juice is determined. Alternatively or additionally, a rate of descent of the particles is determined. Alternatively or additionally, the crystal habitus of calcium carbonate contained in the raw juice is determined. A process parameter of the second carbonation step 3' is set depending on the specific values—that is, the particle size and/or the rate of descent and/or the crystal habit. For example, the added amount of lime milk and/or a target value of the pH value and/or a concentration of the lime milk and/or an added amount of precipitated calcium carbonate can be adjusted depending on the specific values.

In addition, the obtained mixture 26 of first thin juice and precipitated non-sugars is detected by a second sensor device 22' to obtain further second measurement data concerning mixture 26 of first thin juice and precipitated non-sugars after the carbonation step. Alternatively, the other second sensor device 22' can be arranged such that measurement data is detected during the carbonation step 4'. The second sensor device 22' according to the second exemplary embodiment comprises an optical imaging device which detects second image data and a near-infrared spectroscopy device which determines content indication on ingredients of the mixture 26 of raw juice and precipitated non-sugar substances. These are the following ingredients and their content: sucrose, fructose, glucose, lactic acid, oxalic acid, oxalates, nitrates, nitrites, pectins, dextrans, nitrogen. Depending on the determined dextran content, the added amount of dextranase added during juice purification is controlled. Furthermore, the extraction time and/or extraction temperature is set in extraction step 2 depending on the determined glucose content. Depending on the determined glucose content, an evaporation temperature during thickening 6 of the thin juice 27 and/or a dwell time during thickening 6 of the thin juice 27 and/or a number of crystallization steps during crystallization 7 of the thick juice 18 are also set. In addition, a status indication regarding a condition of the filter devices used for filtering 5, for example filter candles, can be determined based on the content of pectins and/or dextrans determined as well as on the image data from the optical imaging device of the other second sensor device 22'.

A third sensor 23' is used to detect further third measurement data concerning the second thin juice 27. The third sensor 23 has a near-infrared spectroscopic device that determines the content of ingredients of the second thin juice 27, a turbidity and/or colour sensor and a Brix sensor. The measurement data detected with the third sensor device 23' enables quality control of the juice purification processes 3, 4, 5, 3', 4', 5'.

A particularly preferred modification of the second exemplary embodiment comprises exactly one first sensor device 21 for detecting first measurement data relating to the mixture of raw juice and lime milk 15 during or after the first liming step 3, and exactly one second sensor facility 22' for detecting second measurement data relating to the mixture of first thin juice and precipitated non-sugar substances 26 during or after the second carbonation step 4'; and exactly one third sensor 23' for detecting third measurement data relating to the second thin juice 27.

The processes and systems described above with the sensor devices 21, 22, 23 enable the analysis and/or control of juice purification and/or other devices or process steps in the sugar production process with low latency.

LIST OF REFERENCE NUMERALS

1 "Cutting" process step
2 "Extraction" process step
3 "Calculation" process step
4 "Carbonation" process step (2 stages)
5 "Filtration" process step
6 "Thickening" process step
7 "Crystallization" process step
8 "Separation" process step
10 cutting machine
11 sugar beet pulp
12 water
13 leftover sugar beet pulp
14 raw juice
15 mixture of raw juice and lime milk
16 mixture of raw juice and precipitated non-sugar substances
17 thin juice
18 thick juice
19 mixture of thick juice and granulated sugar
21 sensor device
22 sensor device
23 sensor device

The invention claimed is:

1. A process for producing thin juice for the production of sugar, wherein lime milk, in a first liming step, is first added to a raw juice to obtain a mixture of raw juice and lime milk, and carbon dioxide, in a first carbonation step, is then added to the mixture of raw juice and lime milk to obtain a mixture of raw juice and precipitated non-sugar substances, and then, in a first filtration step, the mixture of raw juice and precipitated non-sugar substances is filtered to obtain a first thin juice, optionally, in a second liming step, lime milk is added to the first thin juice to obtain a mixture of first thin juice and lime milk, and optionally, including a second carbonation step and a second filtration step, wherein in the second carbonation step, carbon dioxide is added to the first thin juice or the mixture of first thin juice and lime milk to obtain a mixture of first thin juice and precipitated non-sugar substances, and in the second filtration step, the mixture of first thin juice and precipitated non-sugar substances is filtered to obtain a second thin juice, characterized in that at least one sensor device is used to detect a measurement data from:

the mixture of raw juice and lime milk; or the mixture of first thin juice and lime milk during or after the first liming step or during or after the second liming step with the proviso that the method includes the second liming step; or the mixture of raw juice and precipitated non-sugar substances; or the mixture of first thin juice and precipitated non-sugar substances during or after the first carbonation step or during or after the second carbonation step with the proviso that the method includes the second carbonation step; or the first thin juice and/or the second thin juice with the proviso that the method includes the second filtration step;

wherein the at least one sensor device includes an optical imaging device, and the measurement data includes an image data;

wherein:

a geometric property of the particles and/or air inclusions contained in the respective raw juice or thin juice is/are determined based on the image data, or a particle size of particles is determined based on the image data, or a rate of descent of particles is determined based on the image data, or acrystal habit of calcium carbonate is determined based on the image data.

2. The process according to claim 1, characterized in that:

at least one process parameter of the first liming step and/or the second liming step with the proviso that the method includes the second liming step is set depending on the measurement data;

wherein the at least one process parameter includes one or more parameters selected from the group consisting of an added amount of lime milk, a target value of the pH value, a concentration of the lime milk, an added amount of precipitated calcium carbonate, and a withdrawal amount of carbonated juice.

3. The process according to claim 1, characterized in that:

at least one process parameter of the first and/or second carbonation step is set depending on the first-measurement data; or at least one process parameter of the first and/or second filtration step is set depending on the measurement data; or at least one process parameter of the first and/or second liming step is set depending on the measurement data; or wherein the measurement data comprise a content indication of the pectins and/or dextrans, wherein an added amount of dextranase is determined based on the content indication of the pectins and/or dextrans.

4. The process according to claim 1, characterized in that the geometric property of the particles and/or air inclusions contained in the respective raw juice or thin juice is/are determined based on the first, second, and/or third image data.

5. The process according to claim 4, characterized in that:
the geometric property includes a flake shape,
optionally wherein a color of a liquid phase of the respective raw juice or thin juice is determined based on the first, second, and/or third image data.

6. The process according to claim 5, characterized in that, in the first and/or second liming step, an added amount of lime milk is set depending on the identified flake shape of the particles and/or the color of the liquid phase.

7. The process according to claim 5, characterized in that an added amount of dextranase is set depending on the determined flake shape of the particles and/or the determined color of the liquid phase.

8. The process according to claim 1, wherein the at least one sensor device includes a second sensor device, wherein the second sensor device includes
a near-infrared spectroscopy device for a measurement data including a content indication of an ingredient.

9. The process of claim 1, wherein the one or more sensors includes
a turbidity and/or color sensor for measuring a measurement data including a turbidity and/or color indication from the first thin juice and/or the second thin juice with the proviso that the method includes the second filtration step.

10. The process according to claim 9, characterized in that a process parameter of the first and/or second filtration step is set depending on the turbidity and/or color indication.

11. The process of claim 1, wherein the one or more sensors includes
a Brix sensor for measuring a measurement data including a sugar content-from the first thin juice and/or the second thin juice with the proviso that the method includes the second filtration step.

12. The process of claim 1, wherein
the at least one sensor device includes: a sensor device arranged in a bypass line, into which the mixture of raw juice and lime milk or the mixture of first thin juice and lime milk is introduced during or after the first or second liming step, and a standing mixture or a standing thin juice is generated to detect the measurement data.

13. The process according to claim 1, characterized in that:
the particle size of particles is determined based on the measurement data; or
the rate of descent of particles is determined based on the first measurement data.

14. The process according to claim 1, characterized in that the acrystal habit of calcium carbonate is determined based on the measurement data.

15. A process for producing sugar, wherein thin juice is produced according to a process according to claim 1, and sugar is produced from the thin juice in subsequent process steps;
optionally, wherein at least one process parameter of any one of the subsequent process steps is set depending on the a measurement data, wherein the subsequent process step is a thickening step or a crystallization step or a separation step;
optionally, wherein to obtain the raw juice, an extraction step is carried out to obtain the raw juice from sugar beet pulp, wherein at least one process parameter of the extraction step is set depending on a measurement.

16. A sugar production plant with a juice purification facility for the method of claim 1, which is configured to:
first, in a first liming step, add lime milk is first added to a raw juice (14) to obtain a mixture of raw juice and lime milk, and
then, in a first carbonation step, add carbon dioxide to the mixture of raw juice and lime milk to obtain a mixture of raw juice and precipitated non-sugar substances, and
then, in a first filtration step, filter the mixture of raw juice and precipitated non-sugar substances to obtain a first thin juice,
in a second liming step, add lime milk to the first thin juice to obtain a mixture of first thin juice and lime milk, and
in a second carbonation step, add carbon dioxide to the first thin juice or the mixture of first thin juice and lime milk to obtain a mixture of first thin juice and precipitated non-sugar substances, and, in a second filtration step, filter the mixture of first thin juice and precipitated non-sugar substances to obtain a second thin juice,
characterized by:
wherein the sugar production plant includes the at least one sensor device.

17. A process for producing thin juice for the production of sugar, wherein
lime milk, in a first liming step, is first added to a raw juice to obtain a mixture of raw juice and lime milk, and
carbon dioxide, in a first carbonation step, is then added to the mixture of raw juice and lime milk to obtain a mixture of raw juice and precipitated non-sugar substances, and
then, in a first filtration step, the mixture of raw juice and precipitated non-sugar substances is filtered to obtain a first thin juice,
optionally, in a second liming step, lime milk is added to the first thin juice to obtain a mixture of first thin juice and lime milk, and
optionally, including a second carbonation step and a second filtration step, wherein in the second carbonation step, carbon dioxide is added to the first thin juice or the mixture of first thin juice and lime milk to obtain a mixture of first thin juice and precipitated non-sugar substances, and in the second filtration step, the mixture of first thin juice and precipitated non-sugar substances is filtered to obtain a second thin juice,
characterized in that
at least one sensor device is used to detect a measurement data from:
the mixture of raw juice and lime milk; or
the mixture of first thin juice and lime milk during or after the first liming step or during or after the second liming step with the proviso that the method includes the second liming step; or
the mixture of raw juice and precipitated non-sugar substances; or
the mixture of first thin juice and precipitated non-sugar substances during or after the first carbonation step or during or after the second carbonation step with the proviso that the method includes the second carbonation step; or
the first thin juice and/or the second thin juice with the proviso that the method includes the second filtration step;
wherein the measurement data comprise a content indication of pectins and/or dextrans, wherein a status indication of a status of one or more filter devices, optionally including filter candles, is determined on the basis of the content indication of the pectins and/or dextrans used in the filtration step.

18. A process for producing thin juice for the production of sugar, wherein lime milk, in a first liming step, is first added to a raw juice to obtain a mixture of raw juice and lime milk, and carbon dioxide, in a first carbonation step, is then added to the mixture of raw juice and lime milk to obtain a mixture of raw juice and precipitated non-sugar substances, and then, in a first filtration step, the mixture of raw juice and precipitated non-sugar substances is filtered to obtain a first thin juice, optionally, in a second liming step, lime milk is added to the first thin juice to obtain a mixture of first thin juice and lime milk, and optionally, including a second carbonation step and a second filtration step, wherein in the second carbonation step, carbon dioxide is added to the first thin juice or the mixture of first thin juice and lime milk to obtain a mixture of first thin juice and precipitated non-sugar substances, and in the second filtration step, the mixture of first thin juice and precipitated non-sugar substances is filtered to obtain a second thin juice, characterized in that at least one sensor device is used to detect a measurement data from:

the mixture of raw juice and lime milk; or the mixture of first thin juice and lime milk during or after the first liming step or during or after the second liming step with the proviso that the method includes the second liming step; or the mixture of raw juice and precipitated non-sugar substances; or the mixture of first thin juice and precipitated non-sugar substances during or after the first carbonation step or during or after the second carbonation step with the proviso that the method includes the second carbonation step; or the first thin juice and/or the second thin juice with the proviso that the method includes the second filtration step;

wherein the at least one sensor device includes a nitrogen sensor and the measurement data includes a nitrogen concentration.

19. A process for producing thin juice for the production of sugar, wherein lime milk, in a first liming step, is first added to a raw juice to obtain a mixture of raw juice and lime milk, and carbon dioxide, in a first carbonation step, is then added to the mixture of raw juice and lime milk to obtain a mixture of raw juice and precipitated non-sugar substances, and then, in a first filtration step, the mixture of raw juice and precipitated non-sugar substances is filtered to obtain a first thin juice, optionally, in a second liming step, lime milk is added to the first thin juice to obtain a mixture of first thin juice and lime milk, and optionally, including a second carbonation step and a second filtration step, wherein in the second carbonation step, carbon dioxide is added to the first thin juice or the mixture of first thin juice and lime milk to obtain a mixture of first thin juice and precipitated non-sugar substances, and in the second filtration step, the mixture of first thin juice and precipitated non-sugar substances is filtered to obtain a second thin juice, characterized in that at least one sensor device is used to detect a measurement data from:

the mixture of raw juice and lime milk; or the mixture of first thin juice and lime milk during or after the first liming step or during or after the second liming step with the proviso that the method includes the second liming step; or the mixture of raw juice and precipitated non-sugar substances; or the mixture of first thin juice and precipitated non-sugar substances during or after the first carbonation step or during or after the second carbonation step with the proviso that the method includes the second carbonation step; or the first thin juice and/or the second thin juice with the proviso that the method includes the second filtration step;

characterized in that, after carrying out a measurement in a bypass line, a self-cleaning procedure for cleaning the bypass line is carried out.

* * * * *